Figure 1:
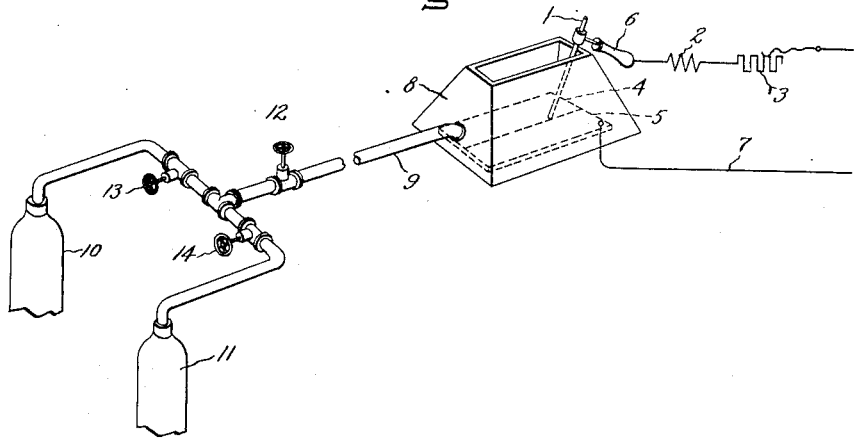

June 18, 1929.　　　E. THOMSON　　　1,717,530

ELECTRIC ARC WELDING

Original Filed June 25, 1926

Inventor:
Elihu Thomson,
by
His Attorney.

Patented June 18, 1929.

1,717,530

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC-ARC WELDING.

Application filed June 25, 1926, Serial No. 118,578. Renewed November 3, 1928.

My invention relates to electric arc welding and particularly to electric arc welding in gaseous media for the production of sound ductile welds.

It is well known that electric arc welds made in air are characterized by a lack of ductility. This brittleness or lack of ductility has been ascribed to various causes. It seems to be the result of compounds formed when the weld metal is subjected to the extremely high temperature of the electric arc in the presence of certain gases. It has been found, for example, that the weld metal is brittle and easily broken as on bending when it is oxidized or contains nitrides. Welds made in an atmosphere of carbon dioxide or illuminating gas are likewise lacking in ductility.

Ductile welds may be made in a hydrogen atmosphere as disclosed and claimed in the applications of Peter P. Alexander Serial No. 758,082, filed December 26, 1924, for methods and apparatus for electric arc welding and Irving Langmuir Serial No. 729,185, filed July 30, 1924, for heating process and apparatus, both of which are assigned to the same assignee as the present application.

I have found that it is possible to produce ductile welds in a gaseous medium composed wholly of carbon monoxide or of a mixture of carbon monoxide and hydrogen, as disclosed and claimed in my application, Serial No. 52,680, filed August 26, 1925, for electric welding, and assigned to the same assignee as the present application.

In accordance with my present invention, the welding operation is conducted in a gaseous medium comprising carbon monoxide or carbon monoxide and hydrogen produced by the dissociation of carbon dioxide in the presence of hydrogen. It is possible to produce ductile welds in mixtures of carbon dioxide and hydrogen in which the percentage of carbon dioxide varies up to substantially 50% of the mixture. If carbon dioxide alone is used, it is apparently decomposed, where in contact with the core of the arc stream, which is of a tremendously high temperature, into carbon monoxide and oxygen and the oxygen by the formation of oxides or indirectly through the formation of nitrides, which are apparently formed from the oxides in the presence of nitrogen, produces brittleness in the weld metal. If, however, hydrogen be present in a quantity sufficient to neutralize all the oxygen liberated or present at the point of welding, it is possible to stop not only the oxidation but also the nitrogenation of the metal. The decomposition of a mixture of 50% carbon dioxide in the presence of 50% hydrogen will give a mixture of 40% carbon monoxide, 20% oxygen and 40% hydrogen. The amounts of hydrogen and oxygen present are sufficient for the formation of water vapor and a reducing medium of dilute carbon monoxide is thus furnished in sufficient quantities to insure a ductile weld. If greater percentages of hydrogen are used, the resulting gaseous medium will be a mixture of carbon monoxide, hydrogen and oxygen, there being an excess of hydrogen over and above that amount necessary to neutralize the liberated oxygen and the resulting mixture comprises carbon monoxide and hydrogen diluted by the presence of water vapor. It is thus possible by the addition of a suitable amount of hydrogen to neutralize the deleterious effect of the oxygen liberated by the carbon dioxide supplied to the arc and protect the molten portions of the weld metal by a suitable atmosphere for the production of sound ductile welds.

In pure carbon monoxide the arc voltage is slightly below that in air. With the addition of hydrogen it rises gradually and it reaches the same value as that in air for mixtures of approximately 30% hydrogen and 70% carbon monoxide. In an atmosphere of hydrogen the critical arc voltage is about 38 volts and the minimum striking voltage or the voltage necessary to strike and maintain the arc is about 120 volts where direct current is used. The striking voltage necessary to strike and maintain an arc in a mixture, according to my present invention, is approximately from 75 to 80 volts, and it thus is practical to use welding equipment designed for arc welding in air for the production of ductile welds in protective gaseous media according to my invention.

My invention may be used for manual, semi-automatic, or fully automatic arc welding. While my invention is particularly applicable to welding of the type where metal is deposited from a fusible electrode such as an iron or steel electrode, it is also applicable where a carbon electrode is used. My invention is also applicable in its broader aspects to arc welding systems in which the arc is maintained between a plurality of electrodes instead of between an electrode and the work to be welded, and non-consuming electrodes may be used if desired.

My invention will be better understood from the following description when considered in connection with the accompanying drawing, and its scope will be pointed out in the appended claims.

Figure 2:
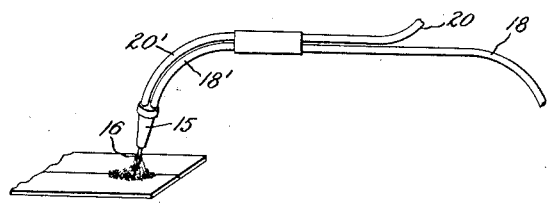

In the drawing, Fig. 1 diagrammatically represents my invention as applied to manual arc welding, and Fig. 2 represents my invention as applied to semi-automatic arc welding.

Fig. 1 diagrammatically shows one arrangement for hand welding in the proposed gaseous atmosphere. The electrode 1, which may be either a metallic or a carbon electrode, is indicated as connected to one side of a suitable source of supply through a reactor 2 and a resistor 3. The work, shown as a pair of plates 4 and 5, is connected to the other side of the source of supply by a conductor 7. The electrode is indicated as held by a suitable holder 6 adapted to be manipulated to cause the arc to be established and maintained between the electrode and the work during the welding operation. In order to simplify the drawing, the source of supply is not shown, but it may be a constant potential source where a series stabilizing resistor such as 3 is used. The source may be, however, an inherently regulated generator which may supply the arc without the use of a stabilizing resistor. A hood 8 of suitable material is shown as covering the work. An asbestos hood or a metal hood provided with a covering of asbestos or the like having an opening therein is satisfactory. The hood may be comparatively small and cover but a portion of the work. Its purpose is to exclude atmospheric air from the arc and the molten portions of the work and to maintain the desired gaseous envelope about the arc and work. The hood has an open top which is only sufficiently large to permit the operator to manipulate the electrode readily. The gaseous medium is conducted to the hood through the conduit 9 from gas containers 10 and 11, which, according to my present invention, contains carbon dioxide and hydrogen respectively. A valve 12 is provided for controlling the supply of gases to the receptacle 8, and suitable means illustrated by the valves 13 and 14 are provided for adjusting the mixture of the gases to produce the proper atmosphere within the receptacle. It will be apparent that my invention is in no wise limited to the particular apparatus described.

Fig. 2 shows the application of my invention to semi-automatic welding apparatus which may be, for example, of the general type disclosed in Letters Patent to Paul O. Noble, No. 1,508,711, September 16, 1924. In this type of apparatus, means are provided for automatically feeding the electrode to the work to maintain the arc. Since such means form no essential part of my invention, they have not been shown in the figure. The figure shows an electrode delivery and gas discharge nozzle 15 through which an electrode 16 may be advanced toward the work by suitable means. The nozzle contains or has associated therewith a passageway adapted to be connected with the gas supply through a conduit 18. This conduit may be a flexible hose. Any suitable construction may be used which maintains the desired gaseous envelope above the arc and work. The electrode may be guided to the tool through a flexible guide tube 20, which may have the welding lead incorporated therein. If desired, the parts 20 and 18 may be combined into a unitary structure. The curved piece 20' may be a small pipe of brass or the like through which the electrode is fed and with which it makes good contact as it is forced around the curve. The part 18' is an extension of conduit 18 and may be either a small piece of pipe or a piece of flexible hose which may be bound against the pipe 20'.

In view of the disclosure in Fig. 2 of a suitable means for semi-automatic arc welding, it is believed that it is unnecessary to show and describe my invention in a fully automatic welding machine where the electrode is not only automatically fed to compensate for its consumption but automatic means are provided for producing relative movement between the arc and the work along the line of the joint to be welded.

My invention is to be distinguished from work which has been done heretofore, particularly in the incandescent lamp art, where an arc is started and quickly interrupted while the parts are protected from oxidation by a suitable medium. According to this prior art, a brief localized heating effect is utilized to produce a small globule of metal to secure a filament to a supporting wire, for example. The arc is not maintained as in applicant's process, and, consequently, there is no pool of molten metal in the work which is acted upon or protected by the gaseous atmosphere, but, on the contrary, the circuit is interrupted as soon as the metal melts sufficiently to form the desired glouble.

The embodiments of the invention illustrated and described herein have been selected for the purpose of clearly setting forth the principles involved. It will be apparent, however, that the invention is susceptible of being modified to meet different conditions encountered in its use. For example, the dissociation of the carbon dioxide in the presence of hydrogen, instead of taking place at the arc, may be occasioned otherwise and the resulting mixture supplied to the arc. I, therefore, aim to cover by the appended claims all modifications within the true spirit and scope of my invention.

What I claim as new and desire to secure by Letters Patent of the United States is:—

1. The method of electric arc welding which comprises maintaining an arc, dissociating carbon dioxide in the presence of approximately an equal volume of hydrogen and welding in a protective envelope of the resulting gaseous mixture.

2. The method of electric arc welding which comprises maintaining an arc, dissociating a gaseous mixture comprising hydrogen and carbon dioxide in which the percentage of carbon dioxide does not materially exceed that of the hydrogen present and conducting the welding operation in a protective envelope of the resulting gaseous mixture.

3. The method of electric arc welding which comprises maintaining an arc, producing by the dissociation of carbon dioxide in the presence of hydrogen a gaseous mixture comprising carbon monoxide and hydrogen and conducting the welding operation in the presence of a protective envelope of said mixture.

4. The method of electric arc welding which comprises maintaining an arc, dissociating carbon dioxide in the presence of a sufficient quantity of hydrogen to neutralize the harmful effect of the liberated oxygen and welding in a protective envelope of the resulting gaseous mixture.

5. The method of electric arc welding which comprises maintaining an arc and supplying to the arc a gaseous mixture comprising hydrogen and carbon dioxide in which the percentage by volume of carbon dioxide does not materially exceed that of the hydrogen present.

6. The method of electric arc welding which comprises maintaining an arc and supplying to the arc a gaseous mixture of hydrogen and carbon dioxide in which the amount of carbon dioxide does not materially exceed 50% by volume of the mixture.

In witness whereof, I have hereunto set my hand this 23d day of June, 1926.

ELIHU THOMSON.